Feb. 13, 1962 S. A. RASCATI ETAL 3,021,419
WELDING APPARATUS

Filed Jan. 22, 1959 2 Sheets-Sheet 1

INVENTORS
Salvatore A. Rascati
Victor S. Peterson
BY
*Eldon H. Luther*
ATTORNEY

INVENTORS
Salvatore A. Rascati
Victor S. Peterson

BY Eldon H. Luther
ATTORNEY

United States Patent Office 3,021,419
Patented Feb. 13, 1962

3,021,419
WELDING APPARATUS
Salvatore A. Rascati, Wallingford, Conn., and Victor S. Peterson, Springfield, Mass., assignors to Combustion Engineering, Inc., New York, N.Y., a corporation of Delaware
Filed Jan. 22, 1959, Ser. No. 788,451
9 Claims. (Cl. 219—124)

This invention relates generally to apparatus for longitudinally welding seams or joints wherein the welding apparatus must be accurately positioned or aligned with respect to the joint that is being welded. The invention has particular relation to such an apparatus wherein there is provided means for insuring accurate alignment of the welding member with the joint or seam.

In certain welding applications wherein an elongated or longitudinal joint is welded together it is extremely difficult to accurately align the welding member, whether it be a welding torch or a welding electrode with the joint merely by observation on the part of the operator.

One such instance is the fabrication of weldments of zirconium that form rather intricate assemblies that are to act as heat exchange means. These assemblies are comprised of a plurality of plates that are positioned in side by side relation with the plates being longitudinally dished or recessed so that an elongated passageway is formed between adjacent plates. In the manufacture of such an assembly it is necessary to weld adjacent plates together along their longitudinally adjoining edges. Since the plates themselves are relatively thin the weld puddle sometimes covers an adjacent seam or joint and since it is essential that the welding electrode by centered directly over the seam within ±.015 inch it will be appreciated that to attempt to follow the seam by eye is extremely difficult if not impossible. In the case of zirconium assemblies this difficulty is compounded since the assembly must be welded in an evacuating chamber or in a chamber within which is provided an inert atmosphere requiring that the operator control the welding remotely and making observation of the welding operation somewhat difficult.

In accordance with the present invention these difficulties are overcome with assurance being had that the welding means is precisely aligned with the seam and with it being unnecessary to actually observe the welding operation insofar as alignment of the electrode with the welding seam is concerned. This is achieved by providing a conductor adjacent the seam that is to be welded and mounted in such a manner that it will move with the seam so that if the seam warps during welding, which is generally the case, the conductor will warp with the seam. In the case of the mentioned zirconium assembly the conductor may advantageously be mounted in the channel formed between adjacent plates. The conductor is insulated from the members that are being welded together and an alternating current is passed through the conductor so as to produce a corresponding alternating magnetic field about the conductor. Mounted on the welding member and adjacent the seam is an electrical apparatus or means that is sensitive to the magnetic field produced by the current flowing through the conductor. This electrical apparatus may, for example, comprise a transducer that will generate varying voltages as its position is varied laterally with respect to the conductor. This electrical means forms part of an electrical circuit which produces a response as the electrical means varies its position laterally of the conductor. This response may actuate an indicator so as to indicate the position of the electrical means and accordingly the welding member with respect to the seam that is being welded with a manual adjustment for the welding member laterally of the seam then being utilized to maintain the welding member aligned with the seam. Alternatively rather than having a manual adjustment, the adjustment of the electrode may be automatic.

It is an object of this invention to provide an improved welding organization wherein a seam or joint that is to be welded may be accurately located and the welding member maintained in accurate alignment therewith.

Other and further objects of the invention will become apparent to those skilled in the art as the description proceeds.

With the aforementioned objects in view, the invention comprises an arrangement, construction and combination of the elements of the inventive organization and method in such a manner as to attain the results desired as hereinafter more particularly set forth in the following detailed description of an illustrative embodiment, said embodiment being shown by the accompanying drawing wherein.

Figure 1:
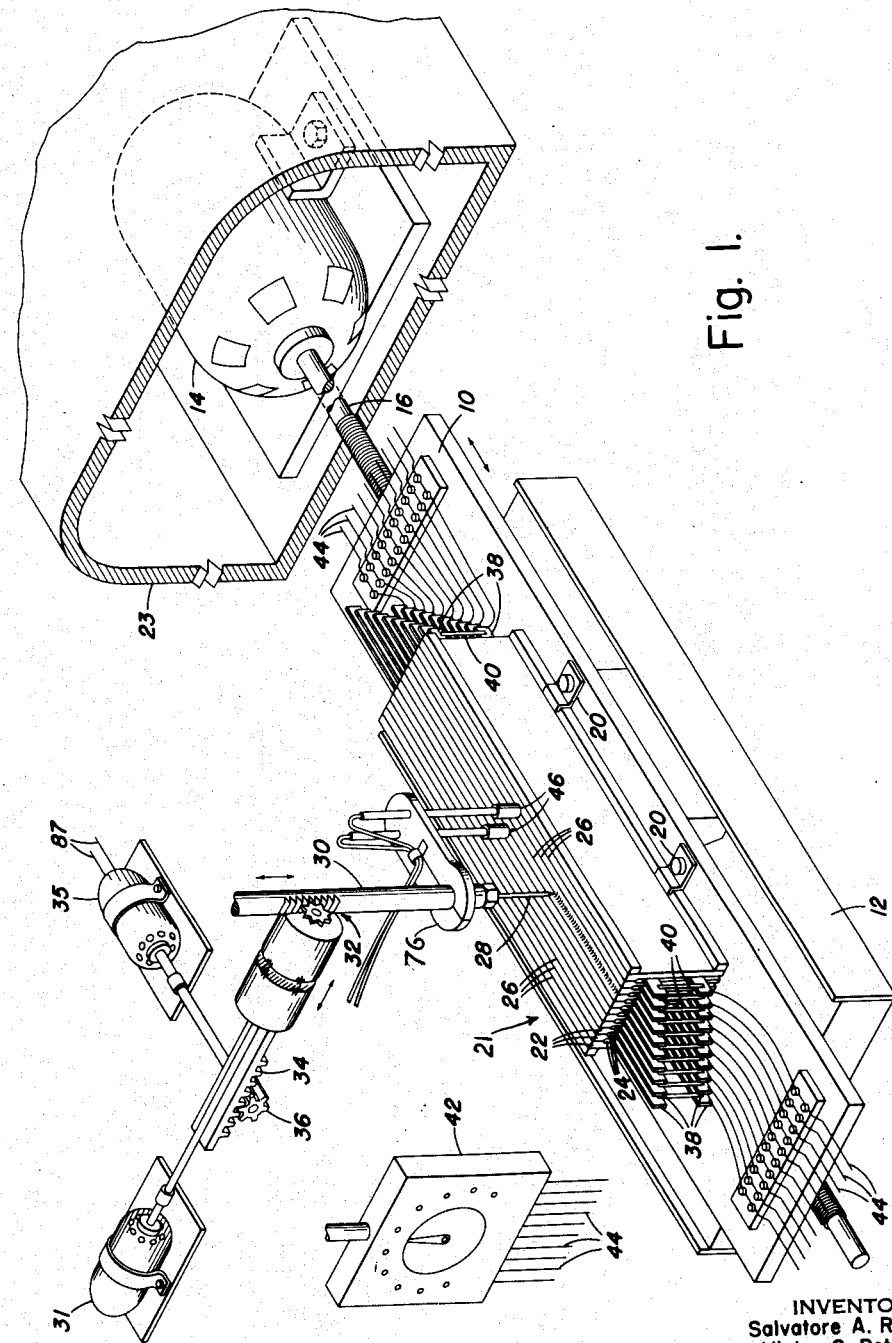
FIG. 1 is a perspective view of a welding organization, with the organization embodying the present invention.

Referring now to the drawing, wherein like reference characters are used throughout to designate like elements, the illustrative and preferred embodiments of the invention depicted therein comprise a bed or carriage 10 which is mounted for longitudinal reciprocal movement along the ways or support 12 with the reciprocal movement of the carriage being had in any desired manner as for example by the reversible electric motor 14 which is connected with screw shaft 16, which is in turn received in a threaded bore provided in a portion of the carriage 10.

Mounted on carriage 10 by means of clamps 20 are a group of zirconium plates 22. These plate members are to be welded together to form a structural heat exchange assembly 21 and as illustratively disclosed each of the plate members is longitudinally dished or recessed so the plates have a transverse section that is generally I shaped with the upper and lower edge of adjacent plates being in engagement as shown whereby longitudinal channels 24 are formed between these adjacent plate members. The plate members 22 are comprised primarily of zirconium so that the welding operation to join the plates together throughout the length of the longitudinal seams or joints 26 must be conducted within a housing 23 that is either evacuated or is provided with an inert atmosphere. This is essential because of the affinity of zirconium for oxygen.

Adjacent plates are welded together throughout the length of seam 26 by means of the welding electrode 28 which is secured to the lower end of support shaft 30 and which is supplied with or connected to a welding voltage source in a conventional manner not here shown. Support shaft 30 is moved vertically by the rack and pinion 32 and motor 31 in known fashion so that the electrode is maintained within a predetermined distance of the seam that is being welded. Additionally, supporting shaft 30 is moved laterally of carriage 10 and accordingly of the assembly 21 by means of rack 34 and pinion 36 with pinion 36 being operated by motor 35. It will be appreciated that the organization depicted in FIG. 1 is somewhat diagrammatic with the details of the support for shaft 30 and the mechanism for moving the same vertically and horizontally being only diagrammatically represented.

The welding operation is conducted by striking an arc between electrode 28 and the seam 26 that is to be welded and by moving carriage 10 and accordingly assembly 21 longitudinally so that the seam passes progressively beneath electrode 28 at a rate such that a satisfactory weld with complete penetration is provided. In order to produce a satisfactory weld it is necessary that the electrode be very accurately aligned with the seam such as within ±.015 inch as previously mentioned and in the organization of the present invention electrical apparatus is provided to insure this required accurate alignment.

This electrical apparatus provides in effect a magnetic field that is accurately located with respect to the seam with means being mounted on support shaft 30 to move therewith and respond to the magnetic field so as to provide an accurate indication or control of the position of electrode 28 with respect to the seam. Positioned within the passage 24 adjacent the upper and lower ends of the passages and accordingly the seams 26 at these ends of the passages are the conductors 38 which, as shown, are in the form of bars with these bars being snugly received within the passages 24 so that each bar will move with the seam 26 with which it is adjacent whereby as the seam warps during the welding operation the bar will similarly warp. The pair of bars in each passage 24 are electrically interconnected at each end by conductor 40 and each such pair of bars is selectively connected to an A.C. source through a selector switch 42 and the conductors 44 whereby each such pair may separately and selectively have an alternating current passed therethrough. The bars are of course electrically insulated from plates 22 and for this purpose the bars may be enameled or anodized.

Figure 2:
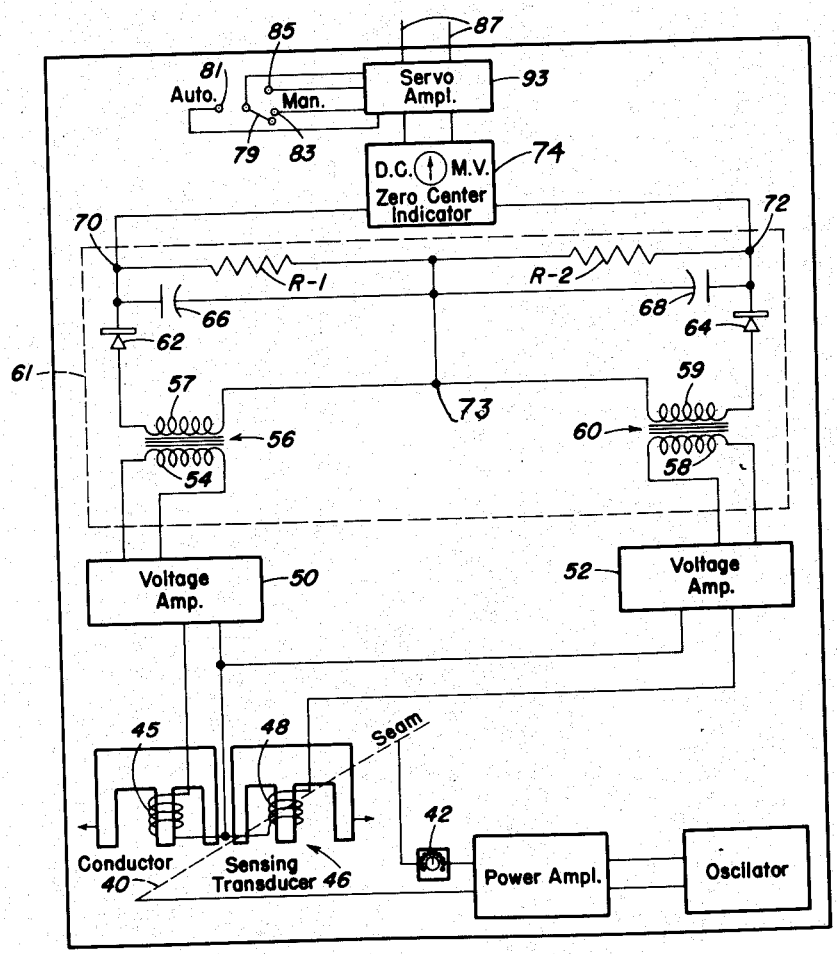
FIG. 2 is a schematic representation of the electrical circuit that forms part of the invention.
Figure 3:
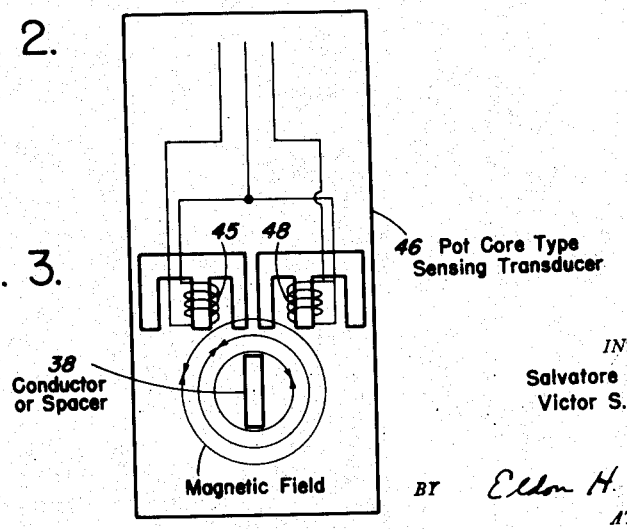
FIG. 3 is a diagrammatic representation of the POT core type transducer that is employed, with this illustration showing the relative location of this transducer and the conductor that is located beneath the seam to be welded and with the magnetic field being represented about the conductor.

Positioned in closely spaced relation with the upper surface of the assembly 21 is the transducer assembly 46 which preferably is of the POT core type as shown in FIGS. 2 and 3. This transducer will of course respond to the varying magnetic field that is established by passing an A.C. current through one of the conductors 38 when positioned within this field. The transducer is comprised of a pair of windings 45 and 48 with the voltage developed across winding 45 being amplified by amplifier 50 while that developed across winding 48 is amplified in amplifier 52. Connected with the output of amplifier 50 is the primary 54 of transformer 56 and similarly connected with the output of amplifier 52 is the primary 58 of transformer 60. The purpose of these amplifiers is to amplify the signals generated in windings 45 and 48 to a level suitable for demodulation by a non-ambiguous type rectifier circuit. Transformers 56 and 60 couple the signal from these amplifiers to this rectifier circuit which is identified by the dotted rectangle 61. This circuit includes secondary windings 57 and 59 connected respectively with the rectifiers 62 and 64 which are connected with the resistors R1 and R2, respectively, with these resistors being in turn connected with the other end of the secondary of the transformers as shown. Capacitors 66 and 68 raise the average D.C. voltage closer to the peak value of the pulsating D.C. voltage at the output of the rectifier. The circuit is arranged so that when the transducer 46 is symmetrically positioned with respect to the magnetic field of conductor 38, as shown in FIG. 3, the rectifier circuit will be balanced and the voltage drop between points 70 and 72 will be zero with the meter 74 being connected across these points to indicate the voltage and accordingly the relative position of the transducer with respect to the conductor 38. Transducer 46 is mounted on bracket 76 which is in turn connected with support shaft 30 so that the transducer moves with the support shaft. The arrangement is such that when the transducer is symmetrically positioned with respect to the conductor 38 of a particular seam 26 or more correctly below this seam the electrode 28 is accurately aligned with the seam and when so positioned equal A.C. voltages are induced in each of the coils 45 and 48. If the transducer assembly moves to the right, as viewed in FIGS. 2 and 3, the A.C. voltage induced in coil 48 will increase and that in coil 45 will decrease with an inverse effect being had with movement to the left. When the transducer assembly is symmetrically positioned with respect to conductor 38, as aforesaid, the voltage amplifiers 50 and 52 will have equal level high amplitude voltages at their output terminals if they have the same voltage gain. Thus the signals across secondary winding 57 and across secondary winding 59 will be equal. Through the action of rectifier 62, capacitor 66 and resistor R1, point 70 will have a positive D.C. potential with respect to point 73 and similarly through the action of rectifier 64, capacitor 68 and resistance R2 point 72 will have a positive D.C. potential with respect to point 73. Both of these D.C. potentials will be the same under the conditions described, and in such case no current will flow through the zero center microammeter 74 connected across points 70 and 72. If the position of the transducer assembly with respect to the conductor 38 is changed, ammeter 74 will deflect in accordance with the direction and magnitude of this change. The microammeter scale can, of course, be calibrated for a given transducer assembly displacement by adjusting the gain of the voltage amplifiers. The refrence zero can also be controlled by the individual gain settings of the amplifiers with these settings being adjustable.

The control of the torch may be either automatic or manual. For automatic control switch 79 is in engagement with contact 81 with the servo amplifier 93 then being effective to control motor 35 in a manner to keep the torch directly over the seam, this amplifier responding to the voltage across ammeter 74. In lieu of the automatic control, reversible motor 35 may be controlled by manual operation of switch 79, with engagement of the switch with contact 83 causing the motor to rotate in one direction while engagement with contact 85 causes the motor to rotate in the opposite direction. Through suitable operation of this switch the ammeter may be kept in its zero position with the electrode accordingly being kept aligned with the seam. Current is supplied to motor 35 through conductors 87.

The source of A.C. potential establishing an A.C. current through the conductors 38 may be any convenient source, as for example, an audio oscillator may be used to provide an audio frequency of 60 to 1000 cycles per second with the output of the oscillator being amplified by a suitable power amplifier which may be adjusted to produce a current of 2.5 amp. through the conductor 38.

In operation, selector switch 42 is operated or actuated so that current is passed through the desired parallel pair of conductors 38. Motor 35 is then operated to move support 30 and accordingly electrode 28 and transducer 46 transversely of the assembly 21. As the transducer approaches the seam 26 beneath which is positioned the conductor 38 through which current is flowing the indicator of ammeter 74 will be deflected. The transducer and electrode are moved laterally to this particular seam and to a position where they are located directly over the seam as indicated by a return of the indicator 74 to its original undeflected position. The welding operation is then commenced by energizing electrode 28 and by longitudinally moving carriage 10 so that the seam progressively passes beneath the electrode. Meter 74 is continuously observed and if the meter is deflected it is immediately brought back to its original position through manipulation of switch 79, if manual operation is had, so that the electrode is maintained accurately aligned with seam 26 throughout the length of the seam and throughout the welding operation. If automatic operation is had this effect will automatically be produced.

It will thus be seen that with this apparatus the seam to be welded is easily found and the electrode maintained in accurate alignment therewith during the welding operation.

Through suitable actuation of selector switch 42 each of the pairs of bars 38 located within each passageway 24 is selectively energized and the seam located above the upper bar in each passageway is in turn welded. After welding the seams 26 on the upper face or side of assembly 21 the assembly is turned over, remounted on carriage 10 and the seams on the other side of the assembly then welded.

In order for this invention to be operative it is necessary that the material that is being welded be nonmagnetic, as is the case in the example mentioned (zirconium being nonmagnetic), since if the material were magnetic the magnetic field about the conductors 38 would be distorted and would vary from one conductor to another rendering it impossible for the device to provide an accurate indication of the position of the electrode 28 with respect to the seam being welded.

It will be noted that transducer 46 is positioned upwardly or forwardly of the welding progression. This is so that the transducer will not be subject to such high temperatures as would otherwise be the case.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. In a welding organization for welding a longitudinal seam of a pair of members of nonmagnetic metal including means for supporting said members, a conductor disposed adjacent said seam at the side thereof opposite that from which the welding is to take place and having an alternating current passed therethrough, said conductor extending longitudinally of the seam and being insulated from the said members and supported by said members so it remains in a predetermined relation with said seam, a welding member disposed adjacent the other side of said seam, means for moving said welding member and said pair of members relative to each other in a direction such that the welding member moves longitudinally of said seam, additional means for moving these members relative to each other laterally of said seam, a pair of inductors adjacent the seam at said other side and in front of the welding member with respect to the relative movement of said members and said seam, said inductors being supported so they move with said welding member and an electrical circuit of which said inductors form a part and which is in a predetermined state when the inductors are disposed relative to the conductor corresponding to the welding member being accurately aligned with the seam with this predetermined state being altered when the inductors are not so disposed, and means for utilizing this alteration of said predetermined state to bring the welding member back into alignment with the seam and return said circuit to said predetermined state.

2. The organization of claim 1 wherein said circuit includes an indicator indicating when said predetermined state is altered.

3. The organization of claim 1 wherein said circuit includes a motor operative to effect said relative lateral movement in response to alterations of the circuit from said predetermined state to bring the welding member into alignment with the seam and return the circuit to said predetermined state.

4. The organization of claim 1 wherein the inductors are arranged on opposite sides of the conductor such that they have equal voltages induced therein when in the position corresponding to the welding member being accurately aligned with the seam, means for amplifying the signal developed across each inductor, means coupling these signals into a circuit that is balanced when the signals are equal and means connected across this circuit to respond to any unbalance thereof.

5. The organization of claim 4 wherein the inductors are wound on and form part of a pot core transducer.

6. In an organization of the type described an assembly comprised of a plurality of similar plates of a nonmagnetic metal disposed in engaging overlying relation, said plates being longitudinally dished such that a narrow laterally extending portion adjacent each longitudinal edge is in engagement with the major portion of adjacent plates being spaced forming a channel, a conductor received in each channel adjacent one edge of the plates such that it will follow the engaging edges if they move laterally and which extends longitudinally thereof, said conductors being insulated from the plates, means to selectively control the passage of an alternating current through the several conductors, means for welding said one edge of the plates together including a welding member adapted to be moved relative to each pair of engaging edges longitudinally thereof and means for insuring that the welding member accurately tracks and is aligned with the edges being welded including electrical sensing means disposed on opposite sides of said engaging edges movable with the welding means, these means responsive to the field developed by an alternating current flowing through the conductor adjacent the particular edge and operative to produce an electrical indication of the position of the welding means relative to said engaging edges.

7. In a welding apparatus, the combination of a plurality of overlying plates of a nonmagnetic metal and presenting a plurality of pairs of adjacent longitudinal edges with each pair forming a seam that is to be welded together, a welding member, means for moving said member and plates relative to each other such that the member will pass longitudinally along each seam and weld the same, means operative to continuously insure accurate alignment of the welding member relative to the seam being welded, this means including a conductor adjacent said seam and mounted so it will move with the seam and accordingly follow any warping thereof, means operative to pass an alternating current through said conductor, and means mounted on opposite sides of said adjacent longitudinal edges and so they move with the welding member, these means being electrically sensitive to the field developed by the current passing through the conductor and operative to give an electrical response when the welding means is not accurately aligned.

8. In combination an assembly of plates disposed in side-by-side engaging relation with their median planes generally vertical, said plates having laterally offset portions extending along their edges with these portions of adjacent plates being juxtaposed forming a seam that is to be welded and providing a channel between the offset portions, a welding member adapted to be successively passed along these seams at the top of the assembly, means for moving said plates and said member relative to each other such that said member moves along the seams, means for moving said member transversely of said seams, an insulated electrical conductor snugly received in each of the channels adjacent the seams at opposite ends thereof and extending longitudinally thereof, means for selectively passing an A.C. current through the conductors, electrical means providing an inductance means moved with the welding member, said inductance means being disposed to lie within the magnetic field about a conductor when the welding member is positioned over the seam adjacent the conductor, said electrical means producing a balanced voltage when the welding member is in alignment with the seam, said voltage varying in magnitude and polarity when the welding member moves laterally out of alignment in either direction, and means responding to said voltage whereby the welding means may be kept accurately aligned with the seam.

9. In an organization of the type described, a pair of nonmagnetic members juxtaposed to provide a longitudinal seam along which they are to be welded together, a closed housing having a substantially oxygen free atmosphere within which said members are disposed, a welding electrode and means for relatively moving said electrode and said members so the electrode passes along said seam to weld the same, a conductor in parallel relation with said seam and mounted so that it moves therewith, means for passing an A.C. current through said conductor, electrical means including apparatus mounted to move with said electrode and responding to the field about the conductor, said electrical means providing a voltage that varies in magnitude and direction as the electrode moves out of alignment with the seam, and means responding to this voltage whereby accurate alignment of the electrode and seam may be maintained.

References Cited in the file of this patent

UNITED STATES PATENTS

| Re. 18,221 | Lincoln | Oct. 6, 1931 |
| 2,588,386 | Hubbard et al. | Mar. 11, 1952 |
| 2,670,423 | Darner et al. | Feb. 23, 1954 |
| 2,679,620 | Berry | May 25, 1954 |

FOREIGN PATENTS

| 379,723 | Great Britain | Sept. 5, 1932 |